United States Patent
Kang et al.

(10) Patent No.: US 9,479,097 B2
(45) Date of Patent: Oct. 25, 2016

(54) APPARATUS AND METHOD FOR INITIALLY DRIVING A SENSORLESS BLDC MOTOR

(71) Applicant: LG ELECTRONICS INC., Seoul (KR)

(72) Inventors: Kyelyong Kang, Seoul (KR); Jaemin Kim, Seoul (KR); Jinseok Hu, Seoul (KR); Shinhyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 14/221,439

(22) Filed: Mar. 21, 2014

(65) Prior Publication Data

US 2014/0285127 A1 Sep. 25, 2014

(30) Foreign Application Priority Data

Mar. 25, 2013 (KR) .................. 10-2013-0031664

(51) Int. Cl.
*H02P 6/04* (2016.01)
*H02P 6/20* (2016.01)

(52) U.S. Cl.
CPC ............... *H02P 6/205* (2013.01); *H02P 6/21* (2016.02); *H02P 21/34* (2016.02)

(58) Field of Classification Search
CPC ........... H02P 21/0035; H02P 23/0077; H02P 27/06; H02P 6/182; H02P 6/18; H02P 6/185
USPC ............ 318/400.11, 400.01, 400.09, 400.15, 318/400.2, 400.26, 400.32, 400.34, 430, 318/455, 461, 489, 503, 504
See application file for complete search history.

(56) References Cited

U.S. PATENT DOCUMENTS

| | | | | |
|---|---|---|---|---|
| 4,471,281 A * | 9/1984 | Uezumi | .............. | H02P 23/0077 318/606 |
| 5,028,852 A * | 7/1991 | Dunfield | .................. | H02P 6/22 318/400.03 |
| 5,298,838 A * | 3/1994 | Peters | ....................... | H02P 6/22 318/400.1 |
| 5,466,999 A * | 11/1995 | Hutsell | ................... | H02P 6/205 318/400.13 |
| 6,100,656 A * | 8/2000 | El-Sadi | ..................... | H02P 6/20 318/400.11 |
| 7,339,344 B2 * | 3/2008 | Borisavljevic | ........... | H02P 6/20 318/719 |
| 7,405,534 B2 * | 7/2008 | Kim | ....................... | H02P 23/14 318/800 |
| 7,906,926 B2 * | 3/2011 | Nagakura | ........... | H02P 29/0016 318/434 |
| 7,915,850 B2 * | 3/2011 | Ting | .................... | B29C 45/5008 318/560 |
| 8,242,725 B2 * | 8/2012 | Thompson | .............. | B60L 11/18 318/400.1 |
| 8,928,265 B2 * | 1/2015 | Qin | ..................... | H02P 21/0042 318/400.02 |
| 2015/0008853 A1* | 1/2015 | Yoo | ........................ | H02P 1/265 318/400.04 |
| 2015/0244298 A1* | 8/2015 | Takaki | .................... | H02P 21/32 318/400.02 |

FOREIGN PATENT DOCUMENTS

CN 1399402 2/2003

OTHER PUBLICATIONS

Chinese Office Action dated Feb. 15, 2016 issued in Application No. 201410114507.X (English Translation attached).

* cited by examiner

*Primary Examiner* — Bentsu Ro
*Assistant Examiner* — Thai Dinh
(74) *Attorney, Agent, or Firm* — KED & Associates, LLP

(57) ABSTRACT

Provided is a sensorless BLDC motor apparatus for providing a drive current allowing the rotor of the BLDC motor to be aligned in a predetermined direction during an initial position setting section (or for a first period of time), and providing a drive current allowing a frequency thereof to be varied at predetermined time intervals so as to accelerate the rotational speed of the BLDC motor during an open loop section (or for a second period of time), and a method using the same.

14 Claims, 13 Drawing Sheets

APPARATUS AND METHOD FOR INITIALLY DRIVING A SENSORLESS BLDC MOTOR

CROSS-REFERENCE TO RELATED APPLICATIONS

Pursuant to 35 U.S.C. §119(a), this application claims the benefit of earlier filing date and right of priority to Korean Application No. 10-2013-0031664, filed on Mar. 25, 2013, the contents of which is incorporated by reference herein in its entirety.

BACKGROUND OF THE DISCLOSURE

1. Field

The present disclosure relates to an apparatus for initially driving a sensorless BLDC motor, and a method using the same.

2. Background

BLDC motor (also brushless DC motor) is a device used in various fields including information processing devices such as a floppy disk drive as well as home appliances such as a refrigerator, an air conditioner or the like. An additional detector is provided to detect the rotational speed of a BLDC motor, the position of a rotor, and the like. However, a BLDC motor provided with no detector is referred to as a sensorless BLDC motor.

In general, the step of driving a motor can be divided into three sections, such as an initial position setting section, an open loop section and a closed loop section. The initial position setting section is a section in which the rotor starts to rotate from a stopped state to move the rotor to a predetermined position, and the open loop section is a low-speed section in which a back electromotive force is not sensed subsequent to setting up the initial position of the rotor, and the closed loop section is a section in which the sensing of a back electromotive force is enabled to normally control the rotor.

According to a typical 180 degree conduction mode, in order to drive a BLDC motor, a predetermined size of current is initially applied to a U-phase for a predetermined period of time to align the rotor of the BLDC motor to the U-phase and then the BLDC motor is immediately driven through sensorless control. In other words, in a state that the rotor of the BLDC motor is aligned to the U-shape, it is assumed that the position of the rotor is zero, and the speed of the motor is immediately controlled through the position of the rotor through sensorless control using this position as a reference position.

In case of controlling the speed of a BLDC motor in this manner, alignment is not completely carried out when the motor is in a high load state during the initial alignment or the position of the motor rotor is not aligned to a reference position but positioned adjacent to the reference position. When the motor is controlled using a sensorless algorithm in such an incomplete initial alignment state of the motor rotor, it may cause a problem in which the driving of the motor is failed due to an initial position error of the motor rotor.

The above references are incorporated by reference herein where appropriate for appropriate teachings of additional or alternative details, features and/or technical background.

SUMMARY OF THE DISCLOSURE

The present disclosure relates to a sensorless BLDC motor apparatus for providing a drive current allowing the rotor of the BLDC motor to be aligned in a predetermined direction to the BLDC motor during an initial position setting section (or for a first period of time), and providing a drive current allowing a frequency thereof to be varied at predetermined time intervals to the BLDC motor so as to accelerate the rotational speed of the BLDC motor during an open loop section (or for a second period of time), and a method using the same.

In order to accomplish the foregoing objects, an apparatus for driving a BLDC motor according to the present disclosure may include an inverter configured to supply a motor drive current to the motor according to a control signal; and a controller configured to generate the control signal, wherein when initially driving the motor, the controller generates the control signal for providing a first drive current allowing the rotor of the motor to be aligned in a predetermined direction to the motor for a first period of time, and providing a second drive current allowing a frequency thereof to be varied at predetermined time intervals to the motor so as to accelerate the rotational speed of the motor for a second period of time.

According to an example associated with the present disclosure, the first period of time may be 1.5-2.5 seconds.

According to an example associated with the present disclosure, the motor may be a 6-pole BLDC motor, and the second period of time may be a period of time corresponding to 0.5 electrical cycle of the motor.

According to an example associated with the present disclosure, the predetermined period of time may correspond to a period of time corresponding to 45 degrees of electrical angle of the motor.

According to an example associated with the present disclosure, the frequency of the second drive current may be gradually increased at the predetermined time intervals.

According to an example associated with the present disclosure, the frequency of the second drive current may be increased by 1 Hz from 2 Hz to 5 Hz at the predetermined time intervals.

According to an example associated with the present disclosure, the controller may include a speed controller configured to generate a reference current for controlling the speed of the motor based on a reference angular velocity, an angular velocity corresponding to the motor; a current controller configured to generate a reference voltage for controlling the motor drive current based on the reference current; and a control signal generator configured to generate the control signal based on the reference voltage.

According to an example associated with the present disclosure, the controller may supply the second drive current to the motor for the second period of time, and then control the inverter based on the current controller being operated regardless of the speed controller for a third period of time.

According to an example associated with the present disclosure, the current controller may generate a reference voltage for controlling the motor drive current based on a forced current instruction value for a third period of time.

According to an example associated with the present disclosure, the controller may detect the position of the motor rotor based on voltage or current information generated by the motor for the second period of time, and generate the forced current instruction value based on the detected position of the rotor.

According to an example associated with the present disclosure, the third period of time may correspond to 0.5-2.5 electrical cycles of the motor.

According to an example associated with the present disclosure, the controller may estimate the position of the rotor based on a sensorless algorithm to control the inverter subsequent to controlling the inverter for the third period of time.

According to an example associated with the present disclosure, the sensorless algorithm may be an algorithm for detecting the position of the rotor based on voltage or current information generated by the motor.

According to an example associated with the present disclosure, the controller may detect an angular velocity corresponding to the motor based on the detected position of the motor to provide it to the speed controller, and control the inverter based on the speed controller and the current controller.

In order to accomplish the foregoing objects, a method for driving a BLDC motor according to the present disclosure, as a method of driving a motor by a driving apparatus, the method may include providing a first drive current allowing the rotor of the motor to be aligned in a predetermined direction to the motor for a first period of time; and providing a second drive current allowing a frequency thereof to be varied at predetermined time intervals to the motor so as to accelerate the rotational speed of the motor for a second period of time.

According to an apparatus for driving a BLDC motor (or driving apparatus) in accordance with an embodiment disclosed herein, a drive current allowing a frequency thereof to be varied at predetermined time intervals may be provided to the BLDC motor to accelerate the rotational speed of the BLDC motor during an open loop section, thereby having an advantage of stably, efficiently driving the motor even at a high load during the initial drive (for example, differential pressure drive).

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION OF THE DISCLOSURE

Figure 1:
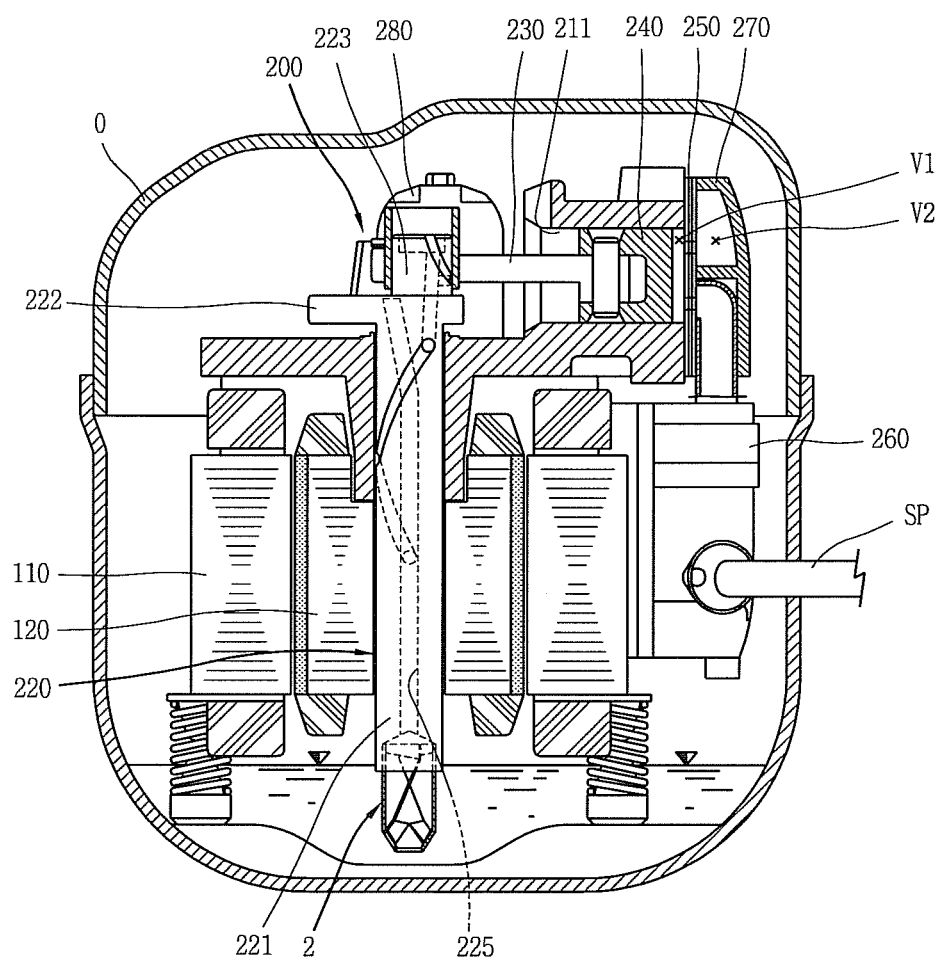
FIG. 1 is a longitudinal cross-sectional view illustrating a reciprocating compressor according to an embodiment.

Technologies disclosed in the present disclosure relate to a motor starting apparatus (or driving apparatus) and a method using the same, and in particular, a motor starting apparatus disclosed in the present disclosure may be used for a compressor or the like applicable to a refrigerator or air conditioner, but technologies disclosed in the present disclosure may be also applicable to various home appliances or electronic devices for which the motor starting apparatus can be used.

It should be noted that technological terms used herein are merely used to describe a specific embodiment, but not to limit the present disclosure. Also, unless particularly defined otherwise, technological terms used herein should be construed as a meaning that is generally understood by those having ordinary skill in the art to which the disclosure pertains, and should not be construed too broadly or too narrowly. Furthermore, if technological terms used herein are wrong terms unable to correctly express the concept of the disclosure, then they should be replaced by technological terms that are properly understood by those skilled in the art. In addition, general terms used in this disclosure should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Furthermore, the terms including such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the disclosure.

Hereinafter, the embodiments disclosed herein will be described in detail with reference to the accompanying drawings, and the same or similar elements are designated with the same numeral references regardless of the numerals in the drawings and their redundant description will be omitted.

In describing the embodiments disclosed herein, moreover, the detailed description will be omitted when a specific description for publicly known technologies to which the disclosure pertains is judged to obscure the gist of the present disclosure. Also, it should be noted that the accompanying drawings are merely illustrated to easily explain the concept of the disclosure, and therefore, they should not be construed to limit the technological concept disclosed herein by the accompanying drawings.

Description of Compressor and Refrigerator

Hereinafter, a compressor and a refrigerator for which a motor starting apparatus (or driving apparatus) according to an embodiment disclosed in the present disclosure is applied or used will be described with reference to FIGS. 1 and 2.

FIG. 1 is a longitudinal cross-sectional view illustrating a reciprocating compressor according to an embodiment.

The present disclosure describes a reciprocating compressor, but it should be clearly understood by those skilled in the art that a motor starting apparatus (or driving apparatus) disclosed in the present disclosure is also applicable to various types or modes of compressors in addition to the foregoing compressor.

Referring to FIG. 1, a reciprocating compressor according to an embodiment may be provided in a closed container, and may include a 3-phase motor 100 configured to be rotated by receiving motor driving power, a compression unit 200 provided at an upper side of the 3-phase motor 100 to receive a rotational force of the 3-phase motor so as to compress refrigerant, and a motor driving apparatus configured to convert input AC power into the motor driving power to drive the 3-phase motor.

The 3-phase motor 100 may have a single phase, and may be implemented with various modes and types of motors. For example, the 3-phase motor 100 may be implemented with a sensorless BLDC motor.

Here, the motor driving apparatus 1 may include a converter configured to rectify input AC power into DC power, and two pairs of switching elements provided at a front end of the 3-phase motor 100, and connected in parallel therewith, and may further include an inverter configured to convert the DC power into the motor driving power, one pair of DC link capacitors provided between the converter and the inverter, each of which is connected in series thereto, and a switching unit provided between a central point of the converter and a series connecting point of the one pair of DC link capacitors to be switched according to a switching signal.

As illustrated in FIG. 1, a reciprocating compressor may include a 3-phase motor 100 provided in the closed container 0 to allow forward/reverse rotation, and a compression unit 200 provided at an upper side of the 3-phase motor 100 to receive a rotational force of the 3-phase motor 100 so as to compress refrigerant.

A constant speed motor or inverter motor allowing forward and reverse rotation may be applicable to the 3-phase motor 100. For example, a blushless DC (BLDC) motor may be preferable for the 3-phase motor 100. Furthermore, the 3-phase motor 100 may include a stator 110 supported by a cylinder block and elastically provided at an inner portion of the closed container 0, and a rotor 120 rotatably provided at an inner side of the stator 110.

The compression unit 200 may include a cylinder block provided with a cylinder 211 to form a compression space and elastically supported by the closed container 0, a crank shaft 220 inserted into the cylinder block to be supported in a journal direction and a thrust direction and coupled to the rotor 120 of the 3-phase motor 100 to transfer a rotational force, a connecting rod 230 rotatably coupled to the crank shaft 220 to convert rotational movement to linear movement, a piston 240 rotatably coupled to the connecting rod 230 to compress refrigerant while being linearly reciprocated in the cylinder 211, a valve assembly 250 coupled to a front end of the cylinder block to have a suction valve and a discharge valve, a suction muffler 260 coupled to a suction side of the valve assembly 250, a discharge cover 270 coupled to accommodate a discharge side of the valve assembly 250, and a discharge muffler 280 communicated with the discharge cover 270 to suppress the discharge noise of the refrigerant being discharged. Undescribed reference numeral 2 on the drawing is oil feeder.

When power is applied to the stator 110 of the 3-phase motor 100, a series of processes are repeated in which the rotor 120 rotates along with the crank shaft 220 due to an interaction force between the stator 110 and rotor 120, and the connecting rod 230 coupled to a cam portion 223 of the crank shaft 220 makes a revolving movement. The piston 240 coupled to the connecting rod 230 compresses refrigerant while being linearly reciprocated in the cylinder 211 to discharge refrigerant to the discharge cover 270, and refrigerant discharged to the discharge cover 270 is exhausted to a freezing cycle through the discharge muffler 280.

At the same time, the oil feeder 2 provided at a lower end of the crank shaft 220 pumps oil stored in a lower bottom portion of the closed container 0 while rotating the crank shaft 220, and part of the oil is inhaled up through an oil passage of the crank shaft 220 to be supplied to each bearing surface while another part thereof is dispersed from an upper end of the crank shaft 220 to cool the 3-phase motor 100.

The crank shaft 220 may include a shaft portion 221 coupled to the rotor 120 and inserted into a shaft receiving hole 212 of the cylinder block to be supported by the cylinder block in a journal direction, an eccentric mass portion 222 eccentrically formed in a fanlike or eccentrically circular flange shape at an upper end of the shaft portion 221 to be supported by a ball bearing 300 laid on a thrust bearing surface of the cylinder block in a thrust direction, and a cam portion 223 eccentrically formed with respect to the shaft portion 221 on an upper surface of the eccentric mass portion 222, into which the connecting rod 230 is rotatably inserted. An oil passage 225 may be provided.

Figure 2:
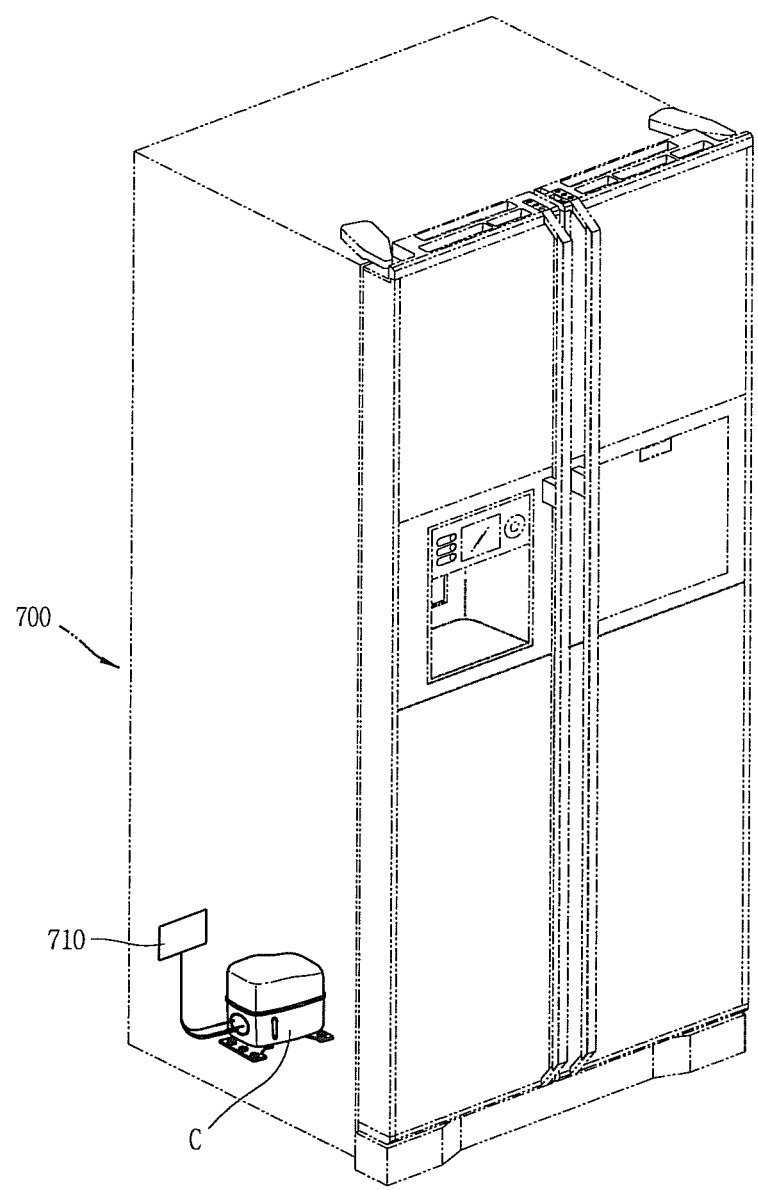
FIG. 2 is a perspective view illustrating a refrigerator to which a reciprocating compressor in FIG. 1 is applied.

FIG. 2 is a perspective view illustrating a refrigerator to which a reciprocating compressor in FIG. 1 is applied.

Referring to FIG. 2, a refrigerator 700 may be provided with a main board 710 configured to control the entire operation of the refrigerator therein, and connected to a reciprocating compressor (C). The compressor control apparatus and a 3-phase motor driving apparatus may be provided in the main board 710. The refrigerator 700 is operated by driving a reciprocating compressor. Cool air supplied to an inner portion of the refrigerator is produced by a heat exchanging operation, and continuously supplied to an inner portion of the refrigerator while repeatedly performing a compression-condensation-expansion-evaporation cycle. The supplied cool air is uniformly transferred to an inner portion of the refrigerator by convection, thereby allowing foods within the refrigerator to be stored at a desired temperature.

Description of Freezing Cycle and Differential Pressure Drive

Hereinafter, the principle of freezing cycle and differential pressure drive in a refrigerator including a compressor for which a motor starting apparatus (or driving apparatus) according to an embodiment disclosed in the present disclosure can be applied or used will be described with reference to FIG. 3.

Figure 3:
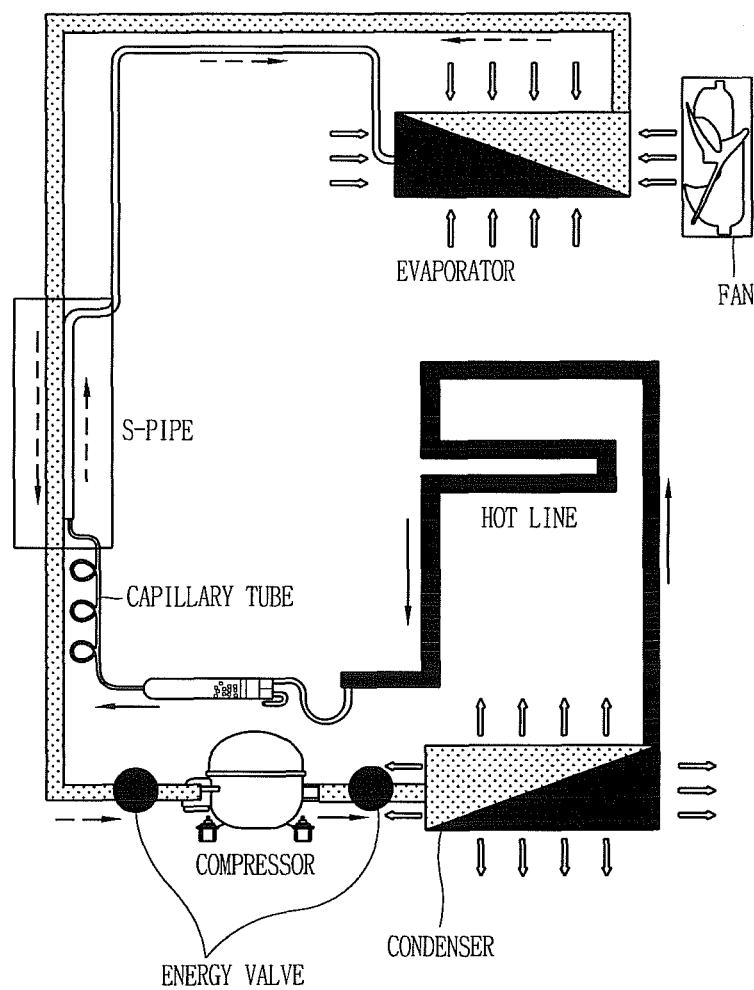
FIG. 3 is an exemplary view illustrating the principle of freezing cycle and differential pressure drive.

FIG. 3 is an exemplary view illustrating the principle of freezing cycle and differential pressure drive.

Referring to FIG. 3, the compressor inhales a room temperature, low pressure gas and then compresses the gas to discharge a high temperature, high pressure gas, and in the evaporator, a low temperature, low pressure refrigerant is evaporated by absorbing ambient heat while passing through the evaporator, and inhaled again to the compressor with a low temperature, low pressure gas.

Furthermore, in the condenser, a high temperature, high pressure refrigerant gas becomes a high pressure liquid, and the hot line (a type of condenser) performs the role of preventing a dew condensation phenomenon on a front surface of the refrigerator.

The refrigerator cycle uses a material that can be liquefied through pressurization as a refrigerant to pressurize it through the compressor, and forms a liquid phase at normal temperature through the condenser to suddenly reduce pressure using a capillary tube, thereby maintaining a low temperature state in the evaporator.

Circulation is carried out in such a manner that the evaporator continuously supplies refrigerant through a capillary tube to maintain low temperature/low pressure and the compressor inhales a gas-phase refrigerant evaporated from the evaporator.

Referring to FIG. 3, a differential pressure drive is carried out based on an energy valve adhered to both ends of the compressor.

Specifically, when the compressor is normally operated and then turned off, a high pressure may be maintained within the compressor since the energy valve is closed.

Furthermore, since a start operation is initiated at a pressure maintained during the restart subsequent to turning off the compressor, a differential pressure drive is carried out, thereby minimizing a loss during the start operation.

However, when controlling the speed of a BLDC motor with such a differential pressure drive, the motor is in a high load state during the initial alignment, and due to this, when the motor is controlled with a sensorless algorithm while the motor rotor is in an incomplete initial alignment state, it may cause a problem in which the motor start operation is failed because of an initial position error of the motor rotor.

Accordingly, a motor driving apparatus and a motor driving method capable of performing an effective and stable start operation during the differential pressure drive may be required.

Description of BLDC Motor, Driving Apparatus (or Control Apparatus, Starting Apparatus) for Driving the Same, and Inverter Structure and Inverter Control Method Contained in the Driving Apparatus Hereinafter, a BLDC motor will be described with reference to FIG. 4.

Figure 4:
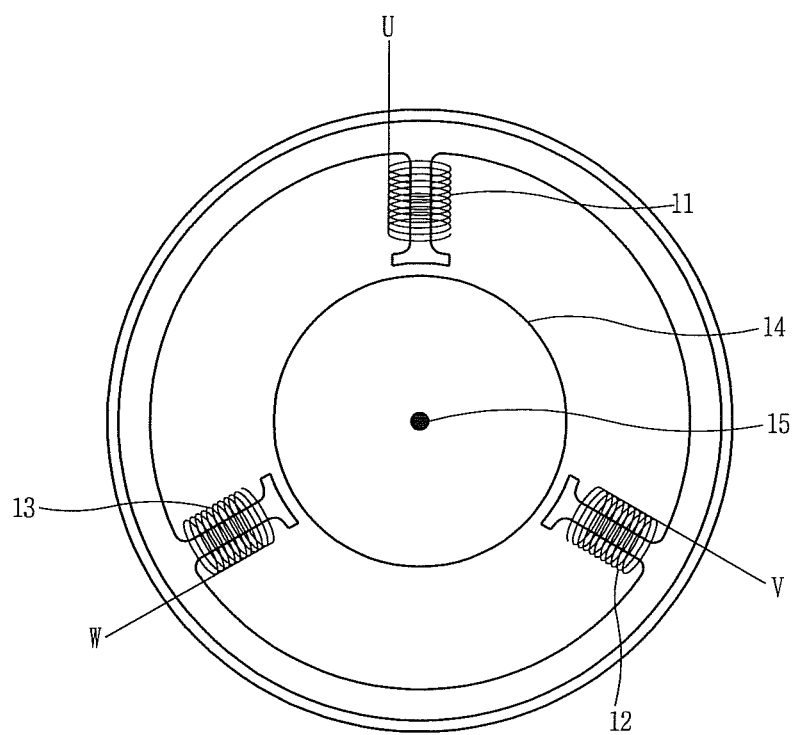
FIG. 4 is a block diagram schematically illustrating the configuration of a sensorless BLDC motor.

FIG. 4 is a block diagram schematically illustrating the configuration of a sensorless BLDC motor.

Referring to FIG. 4, a sensorless BLDC motor may include three U, V, W (or a, b and c) coils 11, 12, 13 and a rotor 14. Furthermore, a mode for controlling the rotational speed of the motor may include a 120 degrees conduction mode and a 180 degrees conduction mode.

First, the 120 degrees conduction mode is a mode in which high (H), low (L), open (O) voltages are alternately applied to each coil of the motor, and a magnetic force generated on the coil due to the voltage rotates the rotor of the motor to control the speed of the motor. Furthermore, the 180 degrees conduction mode is a mode in which a rotational speed of the motor is estimated through a speed estimator to control the rotational speed of the motor without receiving the rotational speed from the motor as a feedback. The controller 180 degrees conduction mode is referred to as a vector control mode.

In general, the step of driving a motor can be divided into three sections, such as an initial position setting section, an open loop section and a closed loop section. The initial position setting section is a section in which the rotor starts to rotate from a stopped state to move the rotor to a predetermined position, and the open loop section is a low-speed section in which a back electromotive force is not sensed subsequent to setting up the initial position of the rotor, and the closed loop section is a section in which the sensing of a back electromotive force is enabled to normally control the rotor.

According to a typical 180 degree conduction mode, in order to drive a BLDC motor, a predetermined size of current is initially applied to a U-phase for a predetermined period of time to align the rotor of the BLDC motor to the U-phase and then the BLDC motor is immediately driven through sensorless control. In other words, in a state that the rotor of the BLDC motor is aligned to the U-shape, it is assumed that the position of the rotor is zero, and the speed of the motor is immediately controlled through the position of the rotor through sensorless control using this position as a reference position.

In case of controlling the speed of a BLDC motor in this manner, alignment is not completely carried out when the motor is in a high load state during the initial alignment or the position of the motor rotor is not aligned to a reference position but positioned adjacent to the reference position. When the motor is controlled using a sensorless algorithm in such an incomplete initial alignment state of the motor rotor, it may cause a problem in which the driving of the motor is failed due to an initial position error of the motor rotor.

Hereinafter, a power conversion apparatus applied to a 3-phase motor, an inverter structure and an inverter control method having the same will be described with reference to FIGS. 5 through 9.

Figure 5:
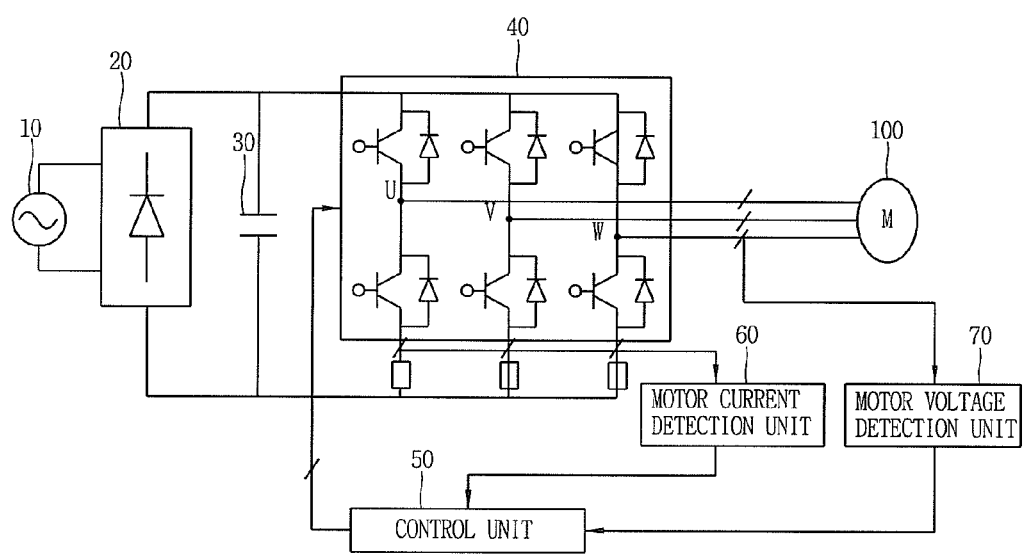
FIG. 5 is a block diagram illustrating the configuration of a 3-phase motor control apparatus.

Referring to FIG. 5, an apparatus for controlling a 3-phase motor according to an embodiment may include a converter 20 configured to rectify input AC power 10 into DC power, an inverter 40 provided at a front end of the 3-phase motor 100 to convert the DC power into the driving power so as to apply the driving power to the 3-phase motor 100, a DC link capacitor 30 provided between the converter 20 and the inverter 40, and a control unit 50 (or controller) configured to generate and output the inverter control signal. Here, various types of motors may be used for the 3-phase motor 100. For example, a blushless DC (BLDC) motor, an AC motor or the like may be used. Hereinafter, a blushless motor will be described as a basic premise, but may be similarly applicable to other types of motors without departing from the scope of the present disclosure.

The converter 20 is connected to an input AC power source 10 to rectify AC power supplied from the input AC power source 10 to DC power. The converter 20 is typically provided with a diode bridge consisting of four diodes to rectify an AC voltage of the AC power by the diodes, and convert it to a DC voltage.

The DC link capacitor 30 is connected in parallel with an output end of the converter 20 to apply a DC voltage produced at both ends of the capacitor, namely, DC link voltage, to an input end of the inverter 40. The DC link capacitor 30 smooths out a ripple voltage (voltage variation) generated in response to a switching frequency while switching the switching elements in the inverter 40. Furthermore, the DC link capacitor 30 can smooth out a rectified voltage according to the converter 20, namely, a varying voltage according to a power voltage.

An end of the inverter 40 is connected in parallel with the DC link capacitor 30, and the other end thereof is connected to the 3-phase motor 100 to switch the output of the DC link capacitor 30 according to an inverter control signal and convert it into a motor drive voltage, typically, a three-phase alternating current, thereby supplying the converted three-phase alternating current to the 3-phase motor 100.

The control unit 50 may include at least a sine wave conduction mode and a square wave conduction mode. Furthermore, the control unit 50 selects a sine wave conduction mode or square wave conduction mode based on a speed instruction for the 3-phase motor 100 to generate an inverter control signal. The sine wave conduction mode may include a space vector pulse width modulation (SVPWM) mode, a discrete PWM (DPWM) mode, and the like. Furthermore, the square wave conduction mode is referred to as a so-called 120 degrees conduction mode.

Referring to FIG. 5 again, a 3-phase motor control apparatus may further include a drive current detection unit 60 for detecting a drive current flowing through the 3-phase motor 100 from the inverter 40. The control unit 50 compares a detection current with an instruction current to generate an inverter control signal for controlling the inverter. The drive current detection unit 60 may be a current transducer connected between the inverter 40 and the 3-phase motor to continuously detect a motor drive current. The current transducer may detect a motor drive current to covert it to a voltage signal, thereby outputting the voltage signal to the control unit 50. The control unit 50 may generate an interrupt signal to sampling a voltage signal according to the motor drive current. Of course, as illustrated in FIG. 5, the drive current detection unit 60 may be a shunt resistor connected in series to a switching element in the inverter 40. In FIG. 5, the drive current detection unit 60 may be connected to detect all drive currents for three phases (3p), but also connected to detect a drive current only for one phase (1p).

When detecting a motor drive current to control the 3-phase motor, the sine wave conduction mode may be typically used for the control unit 50. In case of the sine wave conduction mode, the control apparatus senses the position of an electrical angle using a sensorless algorithm, for example, a voltage equation, a magnetic flux equation, an extended back electromotive force, and the like using a motor drive current. Taking an example of a SVPWM mode, which is one of sine wave conduction modes, a 3-phase hexagonal vector diagram is used. In this case, a current flows from one phase to the other two phases or from two phases to the other one phase, and the duty (also duty cycle) variations of pulse width modulation in three phases are different from one another. A pulse width modulation duty according to an electrical angle is varied in a predetermined output condition. Lead angle control is allowed up to 90 degrees, thereby having a high degree of freedom.

Figure 6:
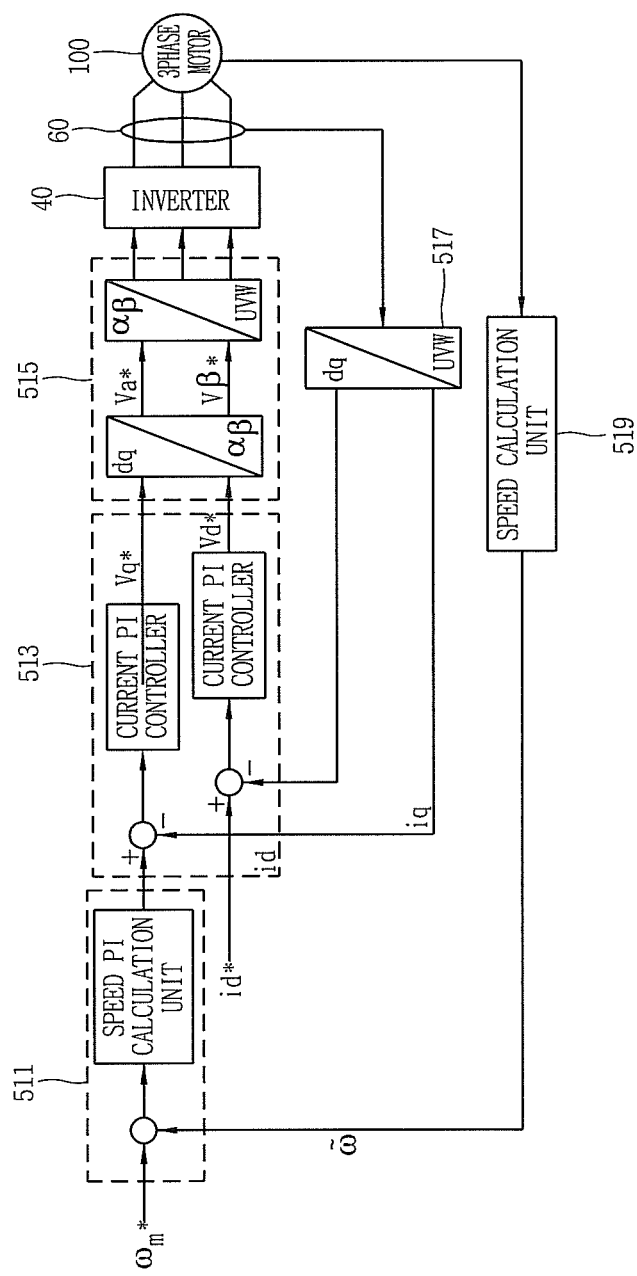
FIG. 6 is a block diagram illustrating the configuration of a sine wave conduction mode in FIG. 5.
Figure 8:
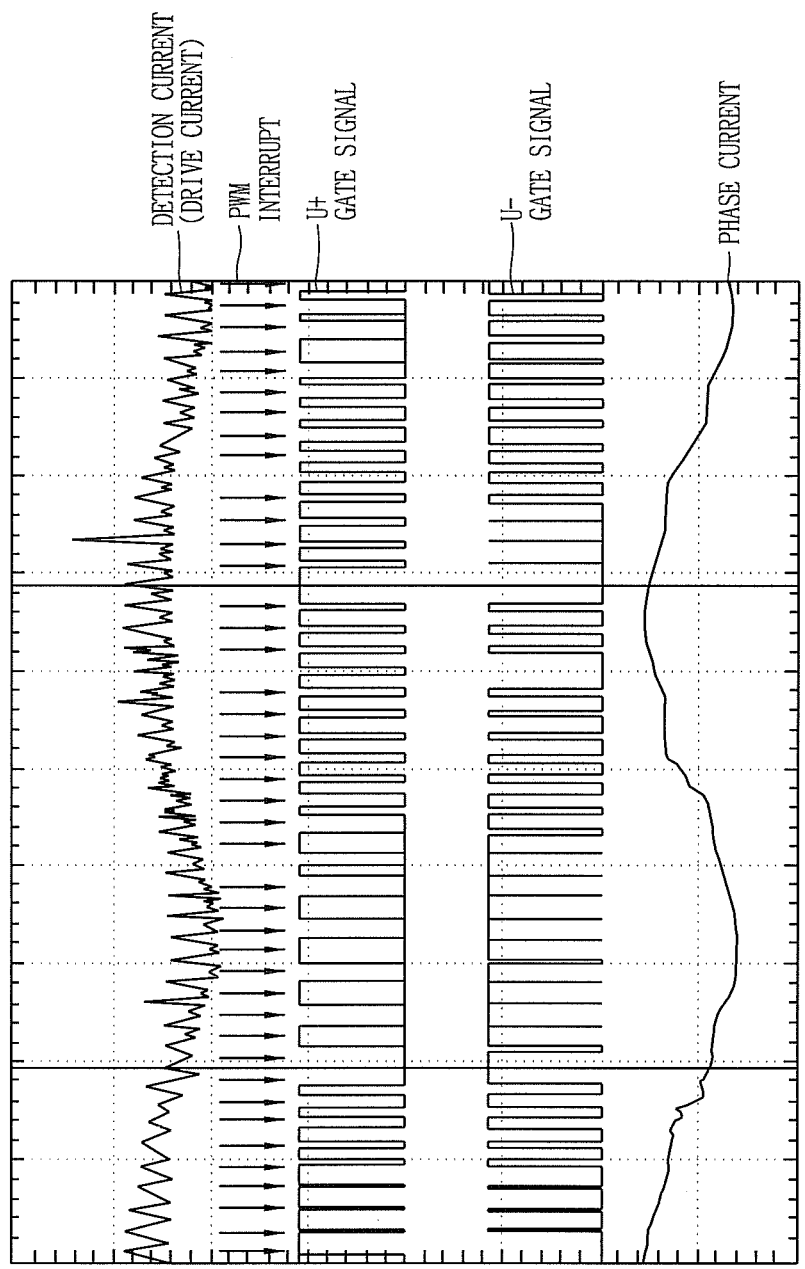
FIG. 8 is a graph illustrating measurement values when driving a motor in a sine wave conduction mode.

Referring to FIG. 6, the control unit 50 may include a sine wave conduction mode controller for controlling the inverter 40 in a sine wave conduction mode. The sine wave conduction mode controller may include a speed controller 511 configured to receive the speed instruction and rotor speed to produce and output a current instruction for reducing a speed error, a current controller 513 configured to receive the current instruction and the drive current to produce and output a voltage instruction for reducing a current error, and a pulse width modulation controller 515 configured to generate the inverter control signal based on the voltage instruction. Furthermore, the sine wave conduction mode controller may further include an axis transformation unit 517 configured to transform three phases into two phases with d-q axes. Furthermore, the sine wave conduction mode controller may further include a speed calculation unit 519 configured to calculate a rotor speed to output it to the speed controller 511. FIG. 8 is a graph illustrating signal measurement values when driving the 3-phase motor with SVPWM which is one of sine wave conduction modes. As illustrated in the drawing, a drive current is detected to generate an inverter control signal, thereby outputting the signal to the gates on the U, V, W phases of the 3-phase motor through the inverter. Here, the graph of a phase current may have a sine wave form.

The speed controller 511 may include a comparator for comparing a user's desired speed instruction ($\omega$*m) with a rotor speed, and a speed proportional integral (PI) controller. The speed controller 511 may receive the speed instruction and rotor speed to proportionally integrate the speed error so as to generate a q-axis current instruction (i*q), and output it to the current controller 513.

The current controller 513 receives a q-axis current instruction and a d-axis current instruction (i*d) generated from the speed controller 511 to generate and output a voltage instruction. The current controller 513 allows a q-axis current instruction to pass through a current proportional integral controller and a filter to output a q-axis voltage instruction (V*q) to the pulse width modulation controller 515. In other words, the current controller 513 compares the q-axis current instruction with a q-axis detection current (iq) into which the motor drive current is axially transformed through the axis transformation unit 517, and allows their difference, namely, a current error, to pass through a current proportional integral controller and a filter to output a q-axis voltage instruction (V*q) to the pulse width modulation controller 515. Meanwhile, the current controller 513 allows a d-axis current instruction to pass through another current proportional integral controller and another filter to output a d-axis voltage instruction (V*d) to the pulse width modulation controller 515. In other words, the current controller 513 compares the d-axis current instruction with a d-axis detection current (id) into which the motor drive current is axially transformed, and allows their difference, namely, a current error, to pass through a current proportional integral controller and a filter to output a d-axis voltage instruction (V*d) to the pulse width modulation controller 515. Here, the voltages and currents are values on a synchronous coordinate system.

The pulse width modulation controller 515, first, axially transforms a voltage instruction of the synchronous coordinate system to a voltage instruction of the stationary coordinate system ($\alpha$, $\beta$). In other words, the pulse width modulation controller 515 transforms (V*d, V*q) into (V*$\alpha$, V*$\beta$). Furthermore, the pulse width modulation controller 515 transforms a voltage instruction of the stationary coordinate system into a form suitable to a motor to be driven to output it. In other words, the pulse width modulation controller 515 transforms a voltage instruction of the stationary coordinate system into three phase voltage instructions (V*u, V*v, V*w) to output them to the inverter 40.

Referring to FIG. 5 again, the control apparatus of the 3-phase motor may further include a drive voltage detection unit 70 for detecting a drive voltage applied to the 3-phase motor 100 from the inverter 40. Here, it is also illustrated that three phase drive voltages are all detected, but only one phase drive voltage can be detected. When detecting a motor drive current to control the 3-phase motor, the control unit 50 typically uses the square wave conduction mode. In case of the square wave conduction mode, the control apparatus detects a zero crossing point of the back electromotive force shown during a section in which conduction is not made due to voltage detection. The square wave conduction mode performs a simple PWM on-duty control operation. In other words, according to the square wave conduction mode, a current flows from one phase to one phase, and PWM switching is made only on one phase, and a PWM duty variation according to an electrical angle in a predetermined output condition is constant. The square wave conduction mode directly detects an electrical angle position with a back electromotive force and thus is beneficial for synchronous drive (operation).

Figure 7:
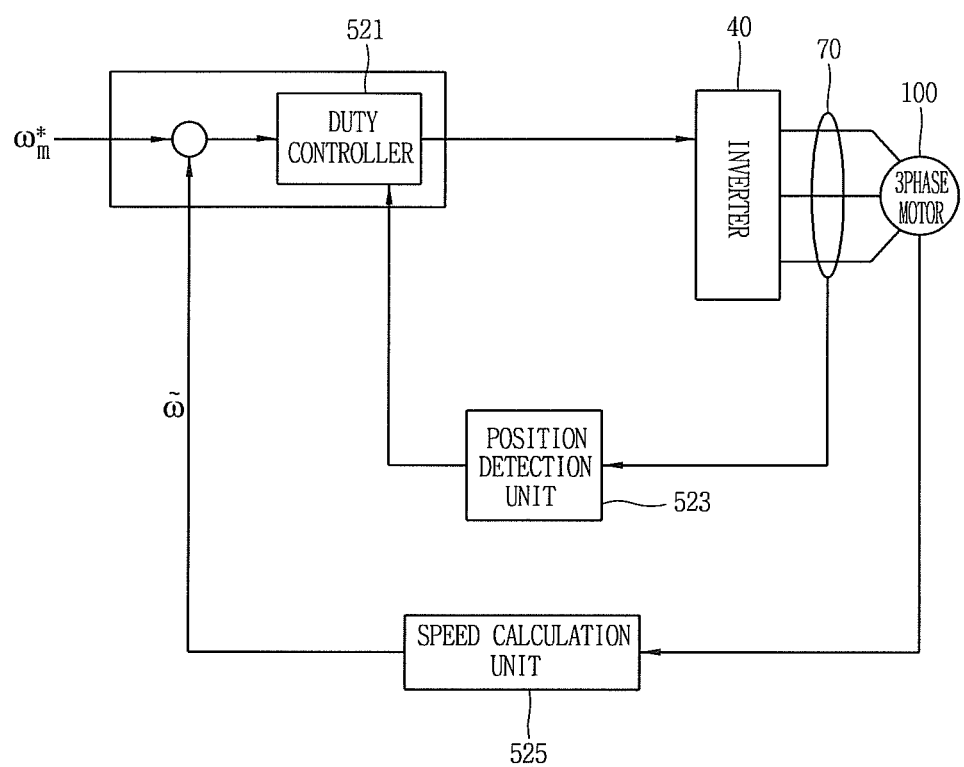
FIG. 7 is a block diagram illustrating the configuration of a square wave conduction mode in FIG. 5.

Referring to FIG. 7, the control unit 50 may include a square wave conduction mode controller for controlling the inverter in the square wave conduction mode. The square wave conduction mode controller may include a duty controller 521 configured to receive the speed instruction and rotor speed to produce a duty of the inverter control signal for reducing a speed error, and a position detection unit 523 configured to detect the position of the rotor based on the drive voltage.

Figure 9:
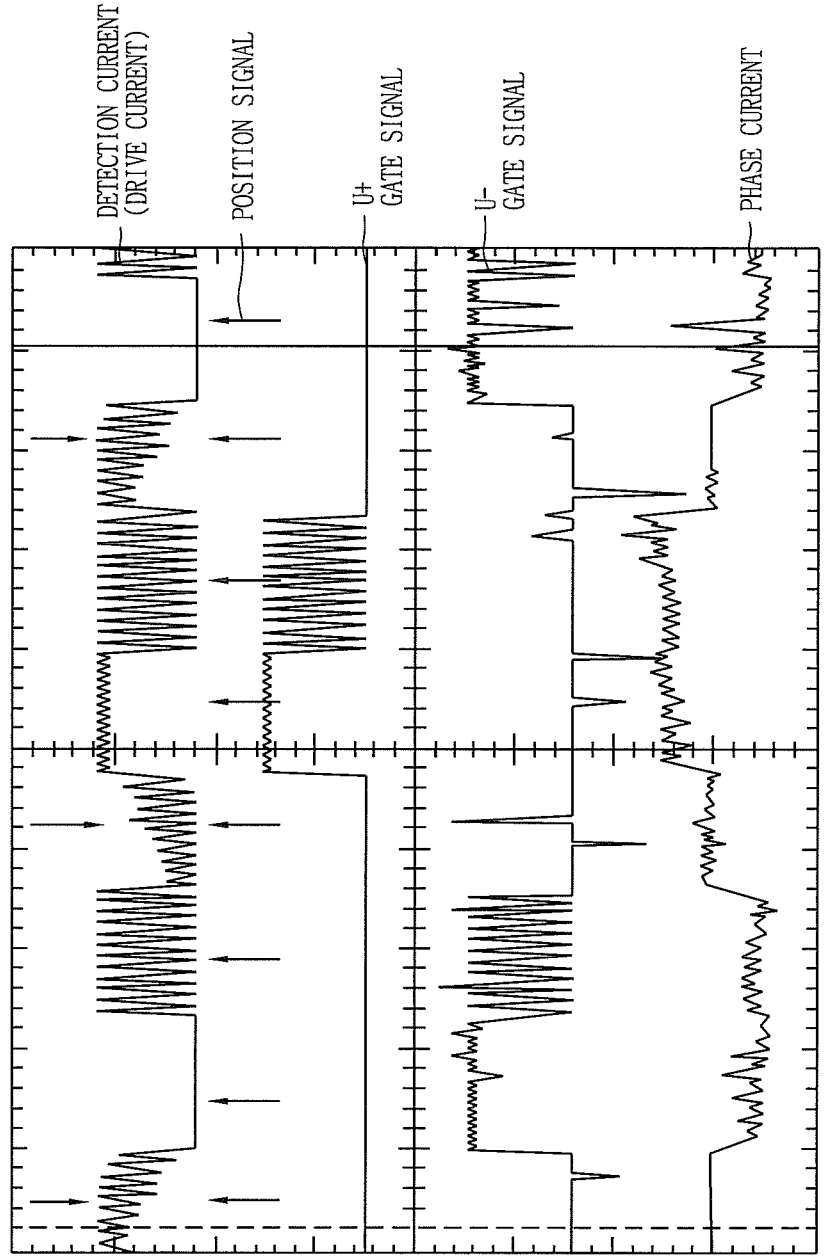
FIG. 9 is a graph illustrating measurement values when driving a motor in a square wave conduction mode.

Furthermore, the square wave conduction mode controller may further include a speed calculation unit 525 configured to calculate a rotor speed to output it to the duty controller 521. The square wave conduction mode may set up a frequency of the drive current according to a speed instruction or frequency instruction to output an inverter control signal for controlling a duty thereof to the inverter 40. FIG. 9 is a graph illustrating measurement values when driving a 3-phase motor in a 120 degrees conduction mode which is one of the square wave conduction modes. Contrary to FIG. 5, the waveform of a phase current has a square wave form. Furthermore, there is a case where a gate signal is not applied to a gate of the U-phase. The control apparatus detects a drive voltage to generate an inverter control signal, thereby outputting the signal to the gates on the U, V, W phases of the 3-phase motor through the inverter.

Though it has been described in the above that the inverter is controlled with a sine wave conduction mode using a drive current or controlled with a square wave conduction mode using a drive voltage in the above, it may be also possible to use opposite cases, such as a square wave conduction mode with a drive current as well as a sine wave conduction mode with a drive voltage. Furthermore, a drive current detection unit or drive voltage detection unit may be separately provided therein, but according to a technology disclosed in the present disclosure, both two detection units can be also provided therein.

Description of Typical BLDC Motor Driving Algorithm

Figure 10:
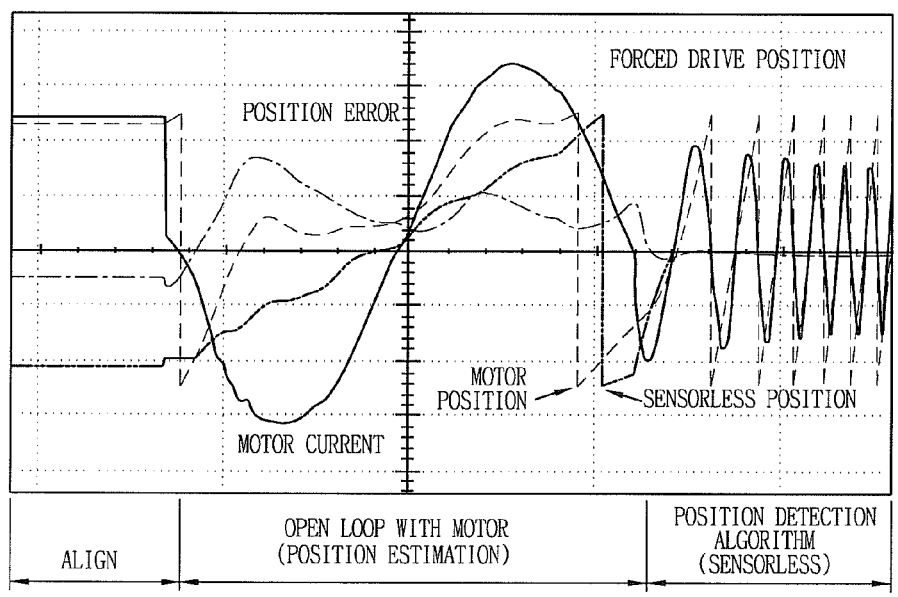
FIG. 10 is an exemplary view illustrating a typical BLDC motor driving algorithm.

FIG. 10 is an exemplary view illustrating a typical BLDC motor driving algorithm.

Referring to FIG. 10, as described above, the step of typically driving a motor can be divided into three sections, such as an initial position setting section, an open loop section and a closed loop section.

During the initial position setting section (ALIGN section in FIG. 10), the motor driving apparatus (or motor starting apparatus, motor control apparatus) may apply a current to the motor rotor to align it to a predetermined position.

The motor driving apparatus may perform the role of converting input AC power into a motor drive voltage or drive current to provide it to the motor, thereby having a technical meaning corresponding to a power conversion apparatus or including a power conversion apparatus.

Next, during the open loop section (or open loop with motor position estimation section in FIG. 10), the motor driving apparatus may forcibly rotate the rotor of the motor by one electrical cycle.

For example, when the rotor of the used BLDC motor has six poles, one electrical cycle may correspond to ⅓ mechanical cycle since electrical three cycles correspond to one mechanical cycle.

Next, during the closed loop or (sensorless section in FIG. 10), the motor driving apparatus may estimate the position of an actual rotor by a sensorless algorithm, and drive the motor of the compressor according to an instruction speed.

The sensorless algorithm may be carried out in various modes. For example, the sensorless algorithm may be an algorithm for detecting the position of the rotor based on voltage or current information generated by the motor.

However, as described above, when an energy valve is applied thereto to reduce a refrigeration driving loss, a high pressure (differential pressure) may be maintained within the compressor to increase a load thereof, thereby causing a problem when driving the compressor because of an increased load due to the high pressure of the compressor.

Hereinafter, an apparatus or method for driving a BLDC motor according to an embodiment disclosed in the present disclosure will be described with reference to FIGS. 11 through 14.

Description of BLDC Motor Driving Apparatus According to an Embodiment Disclosed in the Present Disclosure An apparatus for driving a BLDC motor according to an embodiment disclosed in the present disclosure may include an inverter configured to supply a motor drive current to the motor according to a control signal and a controller configured to generate the control signal, wherein when initially driving the motor.

According to an embodiment, the controller may generate the control signal for providing a first drive current allowing the rotor of the motor to be aligned in a predetermined direction to the motor for a first period of time, and providing a second drive current allowing a frequency thereof to be varied at predetermined time intervals to the motor so as to accelerate the rotational speed of the motor for a second period of time.

Furthermore, according to an embodiment, the first period of time may be 1.5-2.5 seconds.

Furthermore, according to an embodiment, the motor may be a 6-pole BLDC motor (or the rotor of the motor has six poles), and the second period of time may be a period of time corresponding to 0.5 electrical cycle of the motor.

Furthermore, according to an embodiment, the predetermined period of time may correspond to a period of time corresponding to 45 degrees of electrical angle of the motor.

Furthermore, according to an embodiment, the frequency of the second drive current may be gradually increased at the predetermined time intervals.

Furthermore, according to an embodiment, the frequency of the second drive current may be increased by 1 Hz from 2 Hz to 5 Hz at the predetermined time intervals.

Furthermore, according to an embodiment, the controller may include a speed controller configured to generate a reference current for controlling the speed of the motor based on a reference angular velocity, an angular velocity corresponding to the motor; a current controller configured to generate a reference voltage for controlling the motor drive current based on the reference current; and a control signal generator configured to generate the control signal based on the reference voltage.

Furthermore, according to an embodiment, the controller may supply the second drive current to the motor for the second period of time, and then control the inverter based on the current controller being operated regardless of the speed controller for a third period of time.

Furthermore, according to an embodiment, the current controller may generate a reference voltage for controlling the motor drive current based on a forced current instruction value for a third period of time.

Furthermore, according to an embodiment, the controller may detect the position of the motor rotor based on voltage or current information generated by the motor for the second period of time, and generate the forced current instruction value based on the detected position of the rotor.

Furthermore, according to an embodiment, the third period of time may correspond to 0.5-2.5 electrical cycles of the motor.

Furthermore, according to an embodiment, the controller may estimate the position of the rotor based on a sensorless algorithm to control the inverter subsequent to controlling the inverter for the third period of time.

Furthermore, according to an embodiment, the sensorless algorithm may be an algorithm for detecting the position of the rotor based on voltage or current information generated by the motor.

Furthermore, according to an embodiment, the controller may detect an angular velocity corresponding to the motor based on the detected position of the motor to provide it to the speed controller, and control the inverter based on the speed controller and the current controller.

Figure 11:
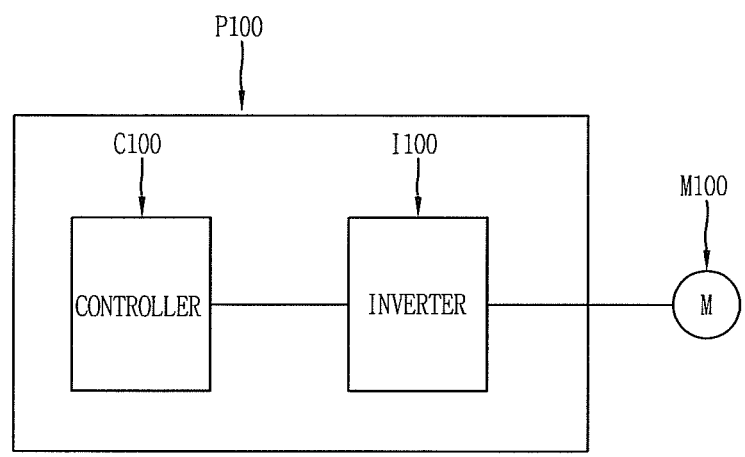
FIG. 11 is a configuration diagram illustrating an apparatus for driving a BLDC motor according to an embodiment disclosed in the present disclosure.

FIG. 11 is a configuration diagram illustrating an apparatus for driving a BLDC motor according to an embodiment disclosed in the present disclosure.

Referring to FIG. 11, a BLDC motor starting apparatus (or motor driving apparatus) P100 according to an embodiment disclosed in the present disclosure may include an inverter (I100) and a controller (C100).

Hereinafter, the constituent elements will be described in sequence.

The inverter I100 may perform the role of supplying a motor drive current to the motor (M100) according to a control signal.

For example, the motor M100 may be a BLDC motor to which a sensorless algorithm is applied.

The inverter I100 performs a function corresponding to or similar to an inverter or the like disclosed in FIGS. 5 through 9, and thus the detailed description thereof will be omitted, and it should be understood by those skilled in the art that a motor driving apparatus and driving method disclosed therein can be applied to all types of inverters to which technologies disclosed herein are applicable.

The controller C100 may perform the role of generating the control signal.

The controller C100 may basically perform the role of a controller, a control unit, a sine wave conduction mode controller or square wave conduction mode controller as illustrated in FIGS. 5 through 9.

According to an embodiment, when initially driving the motor M100, the controller C100 may generate the control signal for providing a first drive current allowing the rotor of the motor M100 to be aligned in a predetermined direction to the motor M100 for a first period of time (or initial position setting section).

Furthermore, the controller C100 may generate the control signal for providing a second drive current allowing a frequency thereof to be varied at predetermined time intervals to the motor M100 so as to accelerate the rotational speed of the motor M100 for a second period of time (or open loop section).

In another sense, the controller C100 may generate the control signal for providing a second drive current allowing a frequency thereof to be varied at predetermined time intervals to the motor M100 so as to increase the rotational frequency of the motor M100 (in a direction of being increased from 2 Hz to 5 Hz) for a second period of time (or open loop section).

Here, the first period of time may be 1.5-2.5 seconds.

Furthermore, according to an embodiment, the motor may be a 6-pole BLDC motor, and the second period of time may be a period of time corresponding to 0.5 electrical cycle of the motor.

Furthermore, according to an embodiment, the predetermined period of time may correspond to a period of time corresponding to 45 degrees of electrical angle of the motor.

Furthermore, according to an embodiment, the frequency of the second drive current may be gradually increased at the predetermined time intervals. For example, the frequency of the second drive current may be increased by 1 Hz from 2 Hz to 5 Hz at the predetermined time intervals.

Figure 12:
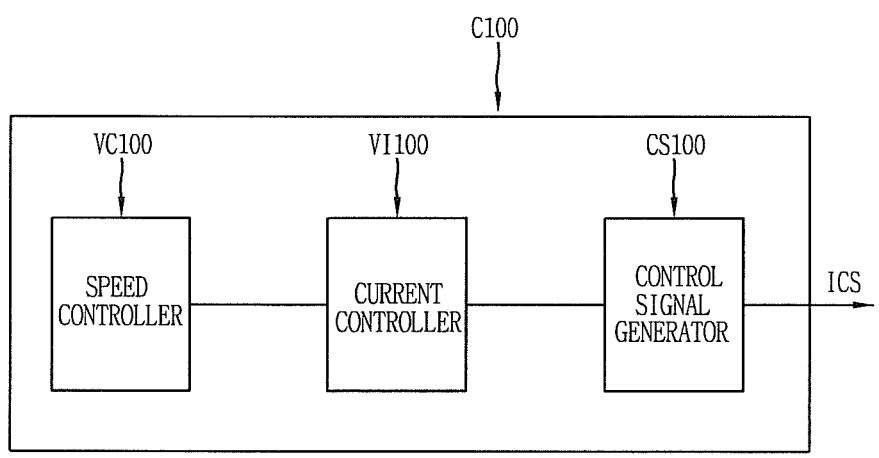
FIG. 12 is a configuration diagram illustrating the configuration of a controller according to an embodiment disclosed in the present disclosure.

FIG. 12 is a configuration diagram illustrating the configuration of a controller according to an embodiment disclosed in the present disclosure.

Referring to FIG. 12, the controller C100 according to an embodiment disclosed in the present disclosure may include a speed controller VC100 (or speed control unit), a current controller VI100 and a control signal generation unit CS100.

The speed controller VC100 may generate a reference current (or current instruction) for controlling the speed of the motor based on a reference angular velocity (or speed instruction), an angular velocity relevant to the motor (or motor rotor speed).

The speed controller VC100 may perform a function corresponding to or similar to the speed controller disclosed in FIGS. 5 through 9. For example, the speed controller VC100 may perform a function corresponding to or similar to the foregoing speed controller 511 for receiving a speed instruction and a rotor speed to produce and output a current instruction for reducing a speed error.

The current controller VI100 may perform the role of generating a reference voltage (or voltage instruction) for controlling a motor drive current based on the reference current (or current instruction).

The current controller VI100 may perform a function corresponding to or similar to the current controller disclosed in FIGS. 5 through 9. For example, the current controller VI100 may perform a function corresponding to or similar to the foregoing current controller 513 for receiving a current instruction and a drive current to produce and output a voltage instruction for reducing a current error.

The control signal generator CS100 may perform the role of generating the control signal (or inverter control signal) based on the reference voltage (or voltage instruction). For example, the control signal generator CS100 may perform a function corresponding to or similar to the foregoing pulse width modulation controller 515 or SVPWM for generating an inverter control signal based on a voltage instruction.

According to an embodiment, the controller C100 may supply the second drive current to the motor M100 for the second period of time, and then control the inverter I100 based on the current controller VI100 being operated regardless of the speed controller VC100 for a third period of time (or quasi-sensorless section which will be described later)

The meaning of controlling the inverter I100 based on the current controller VI100 being operated regardless of the speed controller VC100 may denote turning off (or deactivating) the speed controller VC100 and controlling the inverter I100 only with the current controller VI100.

In this case, the current controller VI100 may generate a reference voltage for controlling the motor drive current (or controlling the inverter I100) based on a forced current instruction value for the third period of time.

For the third period of time, it may be referred to as a quasi-sensorless section since the controller C100 controls the inverter in a manner such that a force current instruction value is discretionally provided to the current controller without using the speed controller.

Furthermore, according to an embodiment, the controller C100 may monitor (or detect) the actual position of a rotor to allow the position estimation of the rotor of the motor M100.

The detected position of the rotor may be used to reduce a position angle error of the rotor during the differential pressure drive.

In other words, in case of a typical sensorless algorithm, when there exists a virtual motor model configured with a motor equation and the motor is operated based on a sensorless model subsequent to the rotor align and open loop section, it may be a mode in which the virtual motor model estimates the actual position of the motor to drive the motor.

In case of a typical algorithm, a position angle error may occur since the position information of a motor has not been known for the open loop section, and then the position is suddenly estimated after the completion of the open loop section.

Accordingly, a method of monitoring the position of a rotor during the open loop operation to use it according to an embodiment may be an algorithm capable of further reducing a position angle error during the start when using the position value of the rotor monitored subsequent to the open loop while a sensorless model estimates the position of the motor rotor using the voltage, current information occurring at the time though the actual motor forcibly draws to drive for the start during the open loop.

There may exist various methods capable of reducing a position angle during the differential pressure drive based on the position value of the rotor.

For example, the controller C100 may reduce a position angle error during the differential pressure drive in a manner of providing a compensation value relevant to the detected position of the rotor to at least one of the speed controller VC100 and the current controller VI100.

Furthermore, for example, the controller C100 may detect the position of the rotor of the motor M100 based on voltage or current information generated by the motor M100 for the second period of time, and generate the forced current instruction value based on the detected position of the rotor.

According to an embodiment, the third period of time may correspond to 0.5-2.5 electrical cycles of the motor M100.

Furthermore, according to an embodiment, the controller C100 may estimate the position of the rotor based on a sensorless algorithm to control the inverter I100 subsequent to controlling the inverter for the third period of time.

Here, the sensorless algorithm may be an algorithm for detecting the position of the rotor based on voltage or current information generated by the motor M100.

Furthermore, according to an embodiment, the controller C100 may detect an angular velocity corresponding to the motor M100 based on the detected position of the motor to provide it to the speed controller VC100, and controls the inverter I100 based on the speed controller VC100 and the current controller VI100.

Figure 13:
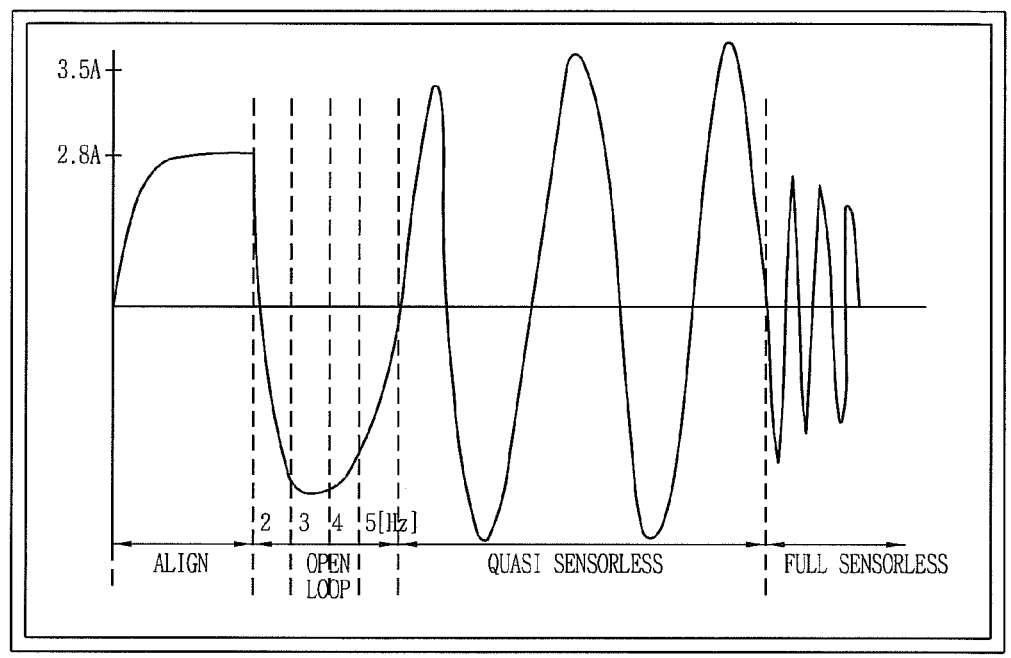
FIG. 13 is an exemplary view illustrating a driving method using a motor driving apparatus according to an embodiment disclosed in the present disclosure.

FIG. 13 is an exemplary view illustrating a driving method using a motor driving apparatus according to an embodiment disclosed in the present disclosure.

Referring to FIG. 13, a motor driving apparatus according to an embodiment disclosed in the present disclosure may apply a current to a motor rotor during an initial position setting section (or for the first period of time, align section) to align it to a predetermined position.

Next, the motor driving apparatus may be accelerated with 2-3-4-5 Hz at 45 degrees of electrical intervals for ½ electrical cycle during the open loop section (or for the second period of time).

Next, the motor driving apparatus may control the inverter based on the current controller regardless of the speed controller during the quasi-sensorless section (or for the third period of time).

According to an embodiment, the quasi-sensorless section may be a period of time corresponding to 0.5-2.5 electrical cycles of the motor.

For example, it may be ½ electrical cycle subsequent to ½ electrical cycle which is the open loop section. In this case, the sum of the open loop section and the quasi-sensorless section may be a period of time corresponding to 1 electrical cycle.

Furthermore, in this case, initial driving talk may be enhanced through motor rotational acceleration and quasi-sensorless control during the open loop section. Furthermore, it may encounter the maximum load (load at a differential pressure) subsequent to 1 cycle of drive in the aspect of compressor stroke characteristics.

Furthermore, according to an embodiment, a quasi-sensorless section may be maintained for 2 electrical cycles (open loop+quasi-sensorless section corresponds to 1 mechanical rotation of the motor). It may be secured for the stability of control. In this case, the quasi-sensorless section may be total 2.5 cycles.

Next, the motor driving apparatus may use the speed controller to allow the motor to estimate the actual position of the rotor by a sensorless algorithm, thereby driving the motor according to an instruction speed (namely, sensorless control section).

As described above, the motor driving apparatus may detect the actual position of the rotor to additionally allow the position estimation of the rotor during the open loop section, thereby reducing an initial rotor position angle error during the differential pressure drive.

Description of Motor Driving Method According to an Embodiment Disclosed in the Present Disclosure A motor driving method according to an embodiment disclosed in the present disclosure as a method for driving a motor by a driving apparatus may include providing a first drive current allowing the rotor of the motor to be aligned in a predetermined direction to the motor for a first period of time, and providing a second drive current allowing a frequency thereof to be varied at predetermined time intervals to the motor so as to accelerate the rotational speed of the motor for a second period of time.

Figure 14:
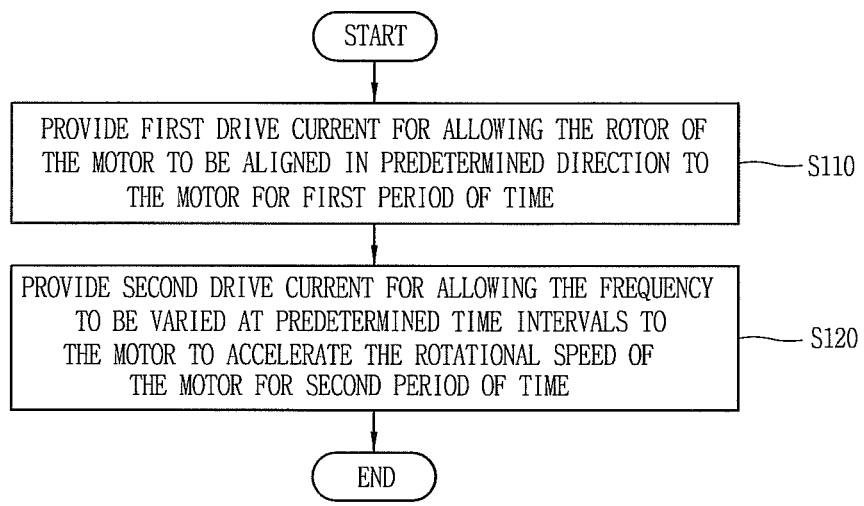
FIG. 14 is a flow chart illustrating a motor driving method according to an embodiment disclosed in the present disclosure.

FIG. 14 is a flow chart illustrating a motor driving method according to an embodiment disclosed in the present disclosure.

Referring to FIG. 14, a motor driving method according to an embodiment disclosed in the present disclosure may be carried out with the following steps.

First, a first drive current allowing the rotor of the motor to be aligned in a predetermined direction may be provided to the motor for a first period of time (S110).

Next, a second drive current allowing a frequency thereof to be varied at predetermined time intervals may be provided to the motor so as to accelerate the rotational speed of the motor for a second period of time (S120).

According to an embodiment, the first period of time may be 1.5-2.5 seconds.

Furthermore, according to an embodiment, the motor may be a 6-pole BLDC motor, and the second period of time may be a period of time corresponding to 0.5 electrical cycle of the motor.

Furthermore, according to an embodiment, the predetermined period of time may correspond to a period of time corresponding to 45 degrees of electrical angle of the motor.

Furthermore, according to an embodiment, the frequency of the second drive current may be gradually increased at the predetermined time intervals.

Furthermore, according to an embodiment, the frequency of the second drive current may be increased by 1 Hz from 2 Hz to 5 Hz at the predetermined time intervals.

Furthermore, according to an embodiment, the driving apparatus may include an inverter configured to supply a motor drive current to the motor according to a control signal, and a controller configured to generate the control signal.

Furthermore, according to an embodiment, the controller may include a speed controller configured to generate a reference current for controlling the speed of the motor based on a reference angular velocity, an angular velocity corresponding to the motor, a current controller configured to generate a reference voltage for controlling the motor drive current based on the reference current, and a control signal generator configured to generate the control signal based on the reference voltage.

Furthermore, according to an embodiment, the controller may supply the second drive current to the motor for the second period of time, and then control the inverter based on the current controller being operated regardless of the speed controller for a third period of time.

Furthermore, according to an embodiment, the current controller may generate a reference voltage for controlling the motor drive current based on a forced current instruction value for a third period of time.

Furthermore, according to an embodiment, the controller may detect the position of the motor rotor based on voltage or current information generated by the motor for the second period of time, and generate the forced current instruction value based on the detected position of the rotor.

Furthermore, according to an embodiment, the third period of time may correspond to 0.5-2.5 electrical cycles of the motor.

Furthermore, according to an embodiment, the controller may estimate the position of the rotor based on a sensorless algorithm to control the inverter subsequent to controlling the inverter for the third period of time.

As described above, according to an apparatus for driving a BLDC motor (or driving apparatus) in accordance with an embodiment disclosed herein, a drive current allowing a frequency thereof to be varied at predetermined time intervals may be provided to the BLDC motor to accelerate the rotational speed of the BLDC motor during an open loop section, thereby having an advantage of stably, efficiently driving the motor even at a high load during the initial drive (for example, differential pressure drive).

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for driving a brushless DC motor (BLDC motor), the apparatus comprising:
   an inverter configured to supply a motor drive current to a motor according to a control signal; and
   a controller configured to generate the control signal,
   wherein, when initially driving the motor, the controller generates a first control signal for a first period of time and generates a second control signal for a second period of time, the second period of time being after the first period of time, and
   wherein the first control signal during the first period of time provides a first drive current to align the motor in a prescribed direction and the second control signal during the second period of time provides a second drive current to accelerate the rotational speed of the motor, a frequency of the second drive current being varied at prescribed time intervals within the second period of time, and
   wherein the frequency of the second drive current is gradually increased at the prescribed time intervals,
   wherein the controller includes:
      a speed controller configured to generate a reference current that controls the speed of the motor based on a reference angular velocity, an angular velocity corresponding to the motor;
      a current controller configured to generate a reference voltage that controls the motor drive current and
      a control signal generator configured to generate the control signal based on the reference voltage,
      wherein the current controller includes:
         a first current controller configured to generate the reference voltage based on the reference current generated by the speed controller; and
         a second current controller configured to generate the reference voltage regardless of the speed controller, and
      wherein the controller supplies the second drive current to the motor during the second period of time, and controls the inverter based on the second current controller during a third period of time, the third period of time being after the second period of time.

2. The apparatus of claim 1, wherein the first period of time is between 1.5 to 2.5 seconds.

3. The apparatus of claim 1, wherein the motor is a 6-pole BLDC motor, and
   the second period of time corresponds to 0.5 electrical cycle of the motor.

4. The apparatus of claim 3, wherein the second period of time corresponds to 45 degrees of electrical angle of the motor.

5. The apparatus of claim 1, wherein the frequency of the second drive current is increased in 1 Hz increments from 2 Hz to 5 Hz at the prescribed time intervals.

6. The apparatus of claim 1, wherein the current controller generates the reference voltage that controls the motor drive current based on a forced current instruction value during the third period of time.

7. The apparatus of claim 6, wherein the controller detects a position of the motor rotor based on voltage or current information generated by the motor during the second period of time, and generates the forced current instruction value based on the detected position of the rotor.

8. The apparatus of claim 1, wherein the third period of time corresponds to between 0.5 to 2.5 electrical cycles of the motor.

9. The apparatus of claim 1, wherein the controller estimates a position of the rotor based on a sensorless algorithm to control the inverter subsequent to controlling the inverter during the third period of time, and
wherein the sensorless algorithm is an algorithm that detects the position of the rotor based on voltage or current information generated by the motor.

10. The apparatus of claim 9, wherein the controller detects the angular velocity corresponding to the motor based on the detected position of the motor to provide the angular velocity to the speed controller, and controls the inverter based on the speed controller and the current controller.

11. A method for driving a brushless DC motor (BLDG motor) by a driving apparatus, the method comprising:
providing a first drive current during a first period of time to align a motor in a prescribed direction; and
providing a second drive current during a second period of time to accelerate the rotational speed of the motor, the second period of time being after the first period of time,
wherein a frequency of the second drive current is varied at prescribed time intervals within the second period of time, and
wherein the frequency of the second drive current is gradually increased at the prescribed time intervals,
wherein the controller includes:
a speed controller configured to generate a reference current that controls the speed of the motor based on a reference angular velocity, an angular velocity corresponding to the motor;
a current controller configured to generate a reference voltage that controls the motor drive current; and
a control signal generator configured to generate the control signal based on the reference voltage,
wherein the current controller includes:
a first current controller configured to generate the reference voltage based on the reference current generated by the speed controller; and
a second current controller configured to generate the reference voltage regardless of the speed controller, and
wherein the controller controls the second drive current to the motor during the second period of time, and controls the inverter based on the second current controller during a third period of time, the third period of time being after the second period of time.

12. The method of claim 11, wherein the first period of time is between 1.5 to 2.5 seconds.

13. The method of claim 11, wherein the motor is a 6-pole BLDG motor, and the second period of time corresponds to 0.5 electrical cycle of the motor, and
wherein the second period of time corresponds to 45 degrees of electrical angle of the motor.

14. The method of claim 11, wherein the current controller generates a reference voltage that controls the motor drive current based on a forced current instruction value during the third period of time, and
wherein the third period of time corresponds to between 0.5 to 2.5 electrical cycles of the motor.

* * * * *